(12) United States Patent
Lipton

(10) Patent No.: US 7,524,053 B2
(45) Date of Patent: Apr. 28, 2009

(54) 3-D EYEWEAR

(75) Inventor: Lenny Lipton, Los Angeles, CA (US)

(73) Assignee: REAL D, Beverly Hills, CA (US)

( * ) Notice: Subject to any disclaimer, the term of this patent is extended or adjusted under 35 U.S.C. 154(b) by 0 days.

(21) Appl. No.: 11/434,535

(22) Filed: May 12, 2006

(65) Prior Publication Data

US 2007/0263169 A1 Nov. 15, 2007

(51) Int. Cl.
*G02C 5/00* (2006.01)
*G02C 7/12* (2006.01)

(52) U.S. Cl. .............................. 351/57; 351/41; 351/49; 351/159; 351/165

(58) Field of Classification Search .................. 351/159, 351/163, 165, 41, 57, 49
See application file for complete search history.

(56) References Cited

U.S. PATENT DOCUMENTS

| | | | | |
|---|---|---|---|---|
| 2,323,518 A | * | 7/1943 | Cochran | 359/465 |
| 3,045,544 A | * | 7/1962 | Schmidt | 359/481 |
| 4,349,251 A | * | 9/1982 | Shedrow | 351/128 |
| 5,007,727 A | * | 4/1991 | Kahaney et al. | 351/47 |
| 6,002,518 A | * | 12/1999 | Faris | 359/465 |
| D431,042 S | * | 9/2000 | Lin | D16/304 |

* cited by examiner

*Primary Examiner*—Darryl J Collins
(74) *Attorney, Agent, or Firm*—Baker & McKenzie LLP

(57) ABSTRACT

A set of eyewear is provided for use with prescription spectacles. The design comprises a plurality of selecting devices formed and configured to be attached to the spectacles to provide stereoscopic viewing of images when worn by a user wearing the spectacles. The eyewear comprises a substrate forming a first selector device and a second selector device, and optical materials provided on the substrate. The optical materials comprise first optical material associated with the first selector device and providing a first orientation along a first axis and second optical material associated with the second selector device and providing a second orientation along a second axis substantially orthogonal to the first axis. The substrate and optical materials are configured to be fixedly mountable to the spectacles.

18 Claims, 6 Drawing Sheets

3-D EYEWEAR

BACKGROUND OF THE INVENTION

1. Field of the Invention

The present invention relates to selection devices for viewing stereoscopic movies and images, and more specifically to three-dimensional (3-D) eyewear or glasses that promote comfort while allowing the user to see a quality stereoscopic image.

2. Description of the Related Art

3-D glasses or eyewear allow a user to view stereoscopic motion pictures and typically incorporate temple-pieces and frames. Every member of the viewing audience must wear 3-D eyewear in order to achieve image selection. Image selection affords the viewer's left eye to see the left image while the right eye image is blocked, and vice versa.

Viewers who do not wear corrective spectacles while viewing motion pictures may easily wear existing cardboard or plastic framed 3-D eyewear. Viewers requiring corrective spectacles in order to view motion pictures must wear existing 3-D eyewear over, or on top of/in front of, their corrective spectacles. This combination of eyewear is an annoyance for users because users do not want to wear two pairs of glasses. Two pairs of glasses are cumbersome and uncomfortable.

There are problems with today's eyewear as constructed with temple-pieces and frames that can result in a viewing experience that is not entirely pleasurable. Manufacturers construct 3-D eyewear products with a one-size-fits-all philosophy that reduces the image quality perceived by the user. Reduced image quality results from the 3-D eyewear being unable to provide uniform coverage over each eye due to the size of the corrective spectacles and alignment of both pairs of glasses. Manufacturers of 3-D eyewear have attempted to improve their cardboard and plastic framed eyewear in an attempt to increase the comfort of spectacle-users. However, the traditional construction methods using temple-pieces and frames have yet to produce a comfortable and satisfying experience for spectacle-users.

Today's cardboard and plastic 3-D eyewear implementations include temple-pieces and frames that are relatively expensive, especially when considering that movie theaters typically supply 3-D eyewear at no charge to the user. The 3-D eyewear is frequently designed for one use only and is disposable. As more movies are presented in the stereoscopic image format, this cost to the movie theaters will continue to increase.

Thus it would be advantageous to offer a 3-D eyewear design that provides stereoscopic image selection, high visual quality, user comfort and ease of use particularly when employed with corrective eyeglasses or spectacles. In addition, lower construction cost is of great commercial importance.

SUMMARY OF THE INVENTION

According to one aspect of the present design, there is provided a set of eyewear for use with prescription spectacles comprising a plurality of selecting devices formed and configured to be attached to the spectacles to provide stereoscopic viewing of images when worn by a user wearing the spectacles.

According to another aspect of the present design, there is provided a set of eyewear for use with spectacles worn by a user when viewing stereoscopic images. The set of eyewear comprises a substrate forming a first selection device and a second selector device, and optical materials provided on the substrate. The optical materials comprise first optical material associated with the first selection device and providing a first orientation along a first axis and second optical material associated with the second selection device and providing a second orientation along a second axis substantially orthogonal to the first axis. The substrate and optical materials are configured to be fixedly mountable to the spectacles.

These and other aspects of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

Reference will now be made in detail to the preferred designs of the invention, examples of which are illustrated in the accompanying drawings and tables. While the invention will be described in conjunction with the preferred designs, it will be understood that they are not intended to limit the invention to those designs. On the contrary, the invention is intended to cover alternatives, modifications, and equivalents, which may be included within the spirit and scope of the invention as defined by the appended claims.

Figure 1A:
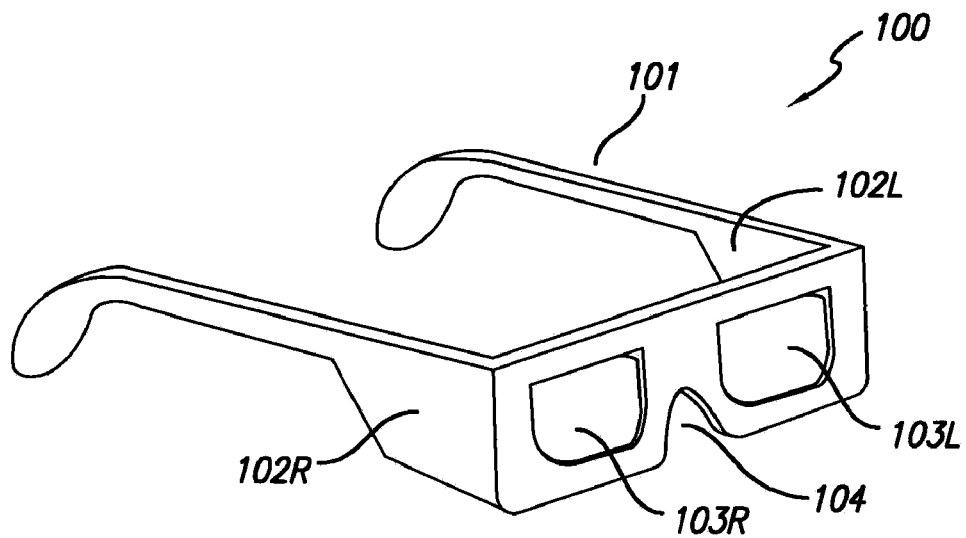
FIG. 1A illustrates a prior art cardboard pair of 3-D stereoscopic eyewear constructed with left and right temple-pieces.

FIG. 1A is a drawing of a pair of 3-D glasses 101 fabricated primarily from a relatively inexpensive material, such as cardboard or paper. Left temple piece 101 and right temple piece 102 are also shown. Front piece 104 includes a depression for the nose, and polarization filters 103L and 103R can be circular or linear, of various orientations and configurations, as is well understood in the art and described below.

Although this disclosure concentrates on the use of circular polarization for image selection, it will be understood that other selection techniques may be employed using the same eyewear design and basic lens fabrication techniques, and these include, but are not limited to, linear polarization, the anaglyph, Pulfrich, and chromostereopsis.

Figure 1B:
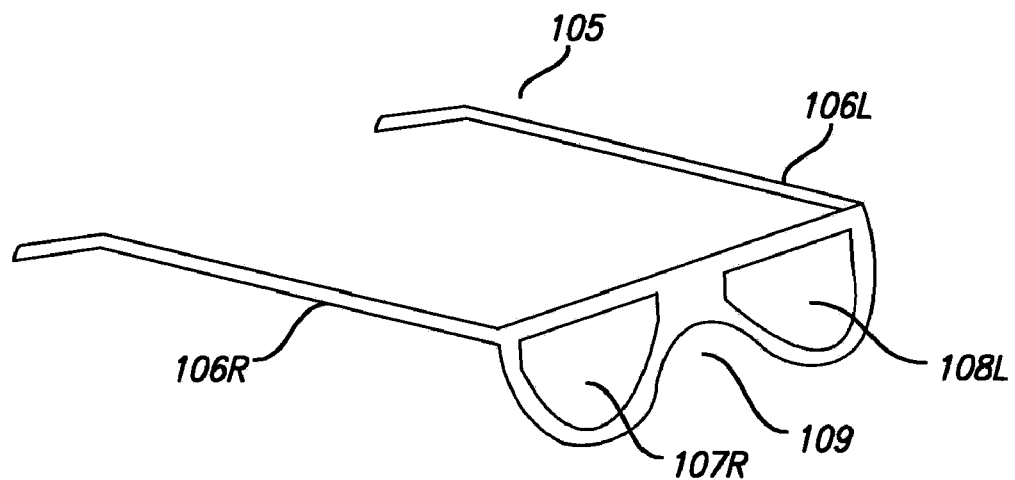
FIG. 1B illustrates a prior art plastic pair of 3-D stereoscopic eyewear constructed with left and right temple-pieces.

FIG. 1B represents a similar product made out of a somewhat more rigid material, such as plastic. Eyewear 105 is shown with left temple piece 106L and right eyewear piece 106R, where front piece 104 includes a nose depression. Left and right polarization filters 108L and 108R are also provided.

Cardboard eyewear 101 has frequently been used, since the late 1930s, as a throwaway product for the projection of stereoscopic motion pictures in theme parks and in the theatrical cinema. Plastic eyewear 105, on the other hand, has frequently been used in theme parks and cleaned and recycled.

The methods for projecting stereoscopic films with selection devices are well known. They have been described many times, and by way of reference see Lipton's *Foundations of the Stereoscopic Cinema*, 1982, Van Nostrand Reinhold Co. Inc., N.Y.

The present design is 3-D eyewear that does away with the clumsy, awkward, and uncomfortable experience that eyeglass wearers endure when watching stereoscopic movies when forced to also wear 3-D glasses of the types shown in FIGS. 1A and 1B. The designs of FIGS. 1A and 1B have been the only products that have been available. FIGS. 1A and 1B are meant to be generic representations, as many variations of these designs have been developed. The point is that wearing one set of eyewear on top of another set of eyewear is not comfortable. Therefore, the present approach seeks to promote comfort while allowing the user to see a good-quality stereoscopic image.

Figure 2A:
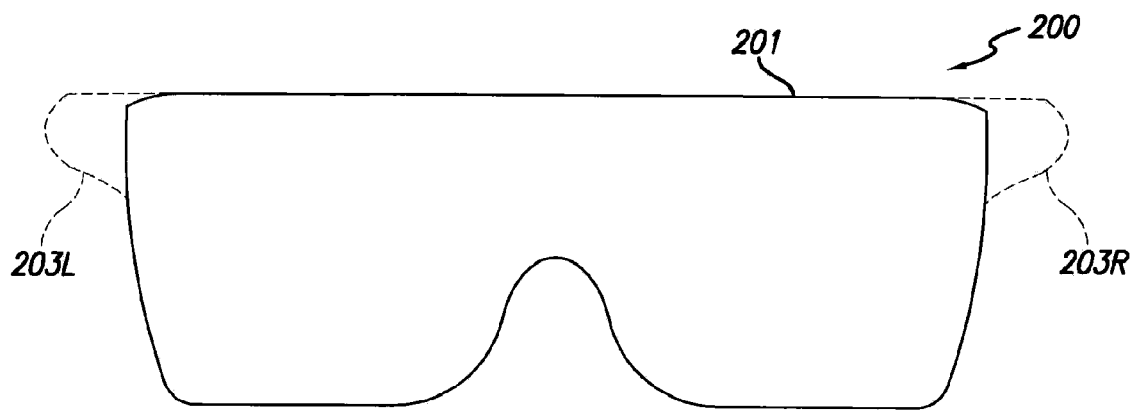
FIG. 2A illustrates the front view of slip-in self-locating 3-D stereoscopic eyewear in accordance with an embodiment of the present design.
Figure 2B:
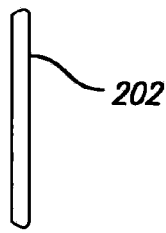
FIG. 2B is the side view of slip-in self-locating 3-D stereoscopic eyewear in accordance with an embodiment of the present design.

FIG. 2A shows 3-D glasses 201 in a front view and FIG. 2B shows 3-D glasses 202 from a side view. The glasses may be only a few tens of thousandths of an inch thick. They can be made of any optically appropriate plastic or similar transparent material. The glasses only need to be thick enough so that they have enough body or rigidity so they are not floppy. The glasses are shaped so that they can be dropped into place behind the user's normal corrective eyewear or glasses—in other words, between the eyes and spectacle frames. 3-D glasses 201 and 202 do not have frames, rims of any kind, or nosepieces, and they do not have temple-pieces.

Left and right tabs 203L and 203R are located on the left and right sides of the eyewear and are indicated by dotted lines. Left and right tabs 203L and 203R are optional, and can serve as a positioning device together with the shape of the eyewear 201 itself. The nose depression in particular can serve as a rest ledge or stop when inserted behind the corrective spectacles, as shown in FIG. 2B, wherein the stops or tabs 203 ride on the corrective spectacle frames 204.

Figure 2C:
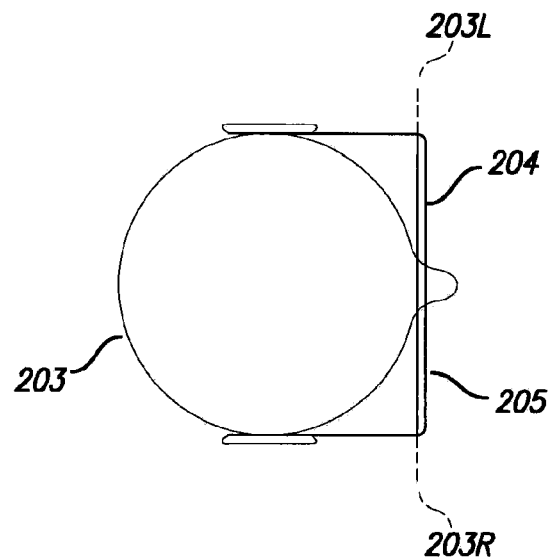
FIG. 2C shows the top view of slip-in self-locating 3-D stereoscopic eyewear in accordance with an embodiment of the present design.

FIG. 2C is a top view of a person 203 wearing corrective spectacles 204, and glasses 205 represent a top view of the 3-D rimless, temple-piece-less 3-D glasses shown in FIG. 2A. In FIG. 2B, glasses 205 rest behind the eyewear/spectacles and between the person's face and spectacles 204.

Figure 3A:
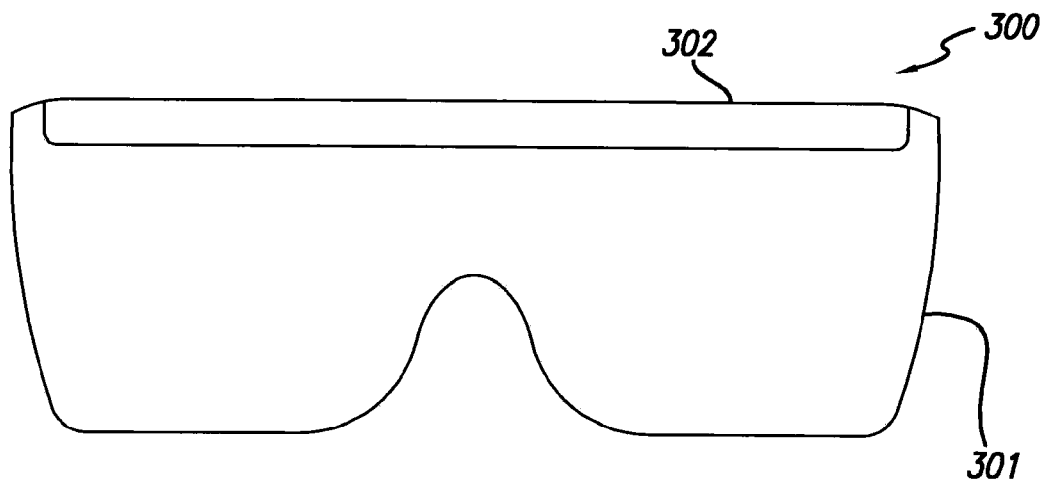
FIG. 3A illustrates the front view of rimless spectacles with a curved ridge 3-D stereoscopic eyewear positioned between the viewers eyes or face and corrective spectacles in accordance with a second embodiment of the present design.
Figure 3B:
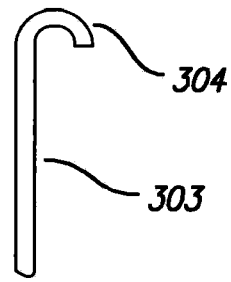
FIG. 3B illustrates the side view of rimless spectacles with a curved ridge 3-D stereoscopic eyewear in accordance with the second embodiment of the present design.
Figure 3C:
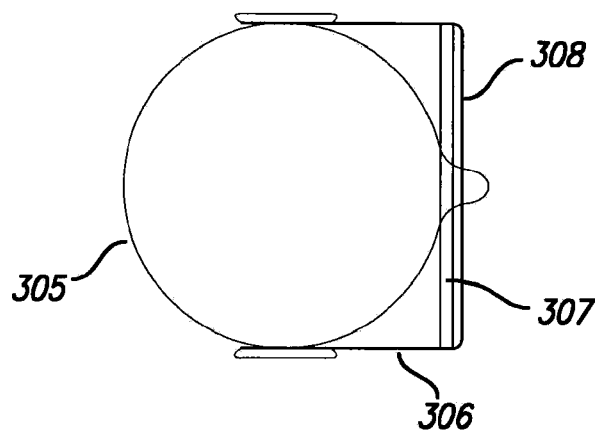
FIG. 3C is a top view of rimless spectacles with a curved ridge 3-D stereoscopic eyewear in accordance with the second embodiment of the present design.

FIGS. 3A through 3C illustrate an alternate embodiment. In FIG. 3A, rimless spectacles 301 are shown with a curved ridge 302. In the side view shown in FIG. 3B, the 3-D glasses 303 are shown with curved ridge 304. The ridge curves away from the face of the user. FIG. 3C is a drawing of a person 305 wearing corrective lens spectacles 306, and the 3-D glasses 307 are placed between the eyes of the person and his spectacles. The rim 308 (corresponding to 302/304) serves to support the 3-D glasses on the frame or top of the corrective spectacles. In a sense, these are similar to eyewear known as a "clip-on," (one might say a "hang-on,") hanging behind the spectacles and in front of the user's eyes.

Figure 4A:
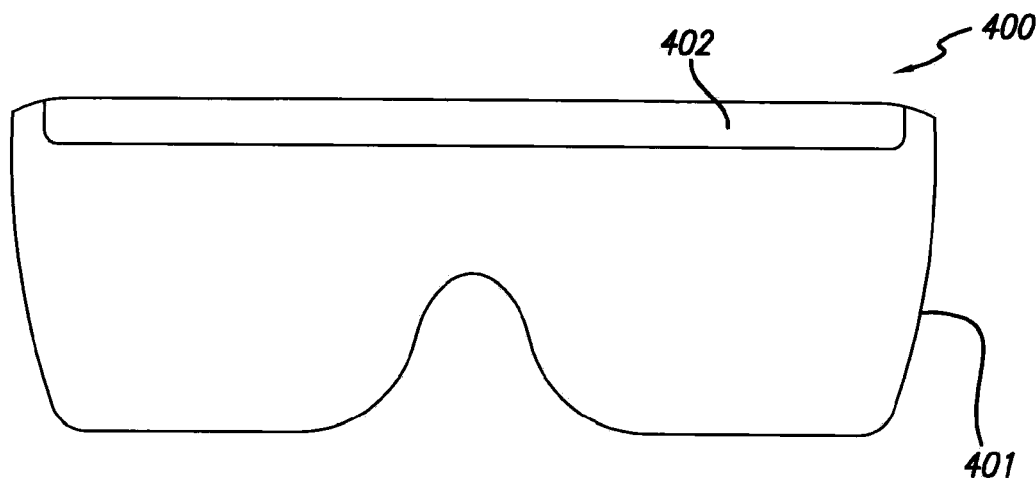
FIG. 4A illustrates the front view of rimless spectacles with a curved ridge 3-D stereoscopic eyewear in accordance with the second embodiment of the present design.
Figure 4B:
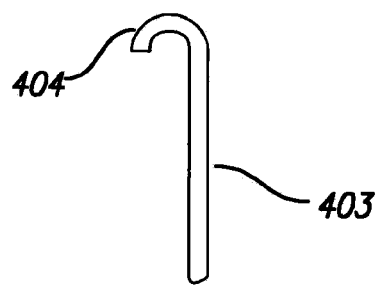
FIG. 4B illustrates the side view of rimless spectacles with a curved ridge 3-D stereoscopic eyewear in accordance with the second embodiment of the present design.
Figure 4C:
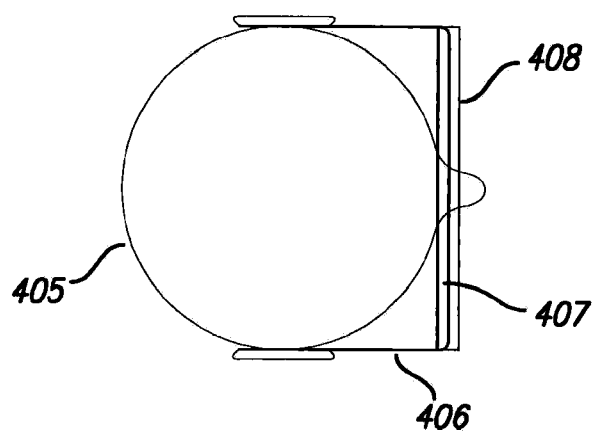
FIG. 4C is a top view of rimless spectacles with a curved ridge 3-D stereoscopic eyewear in accordance with the second embodiment of the present design.

A further embodiment is illustrated in FIGS. 4A through 4C. A similar approach is shown, except this time the 3-D eyewear hang on the outside of the glasses. FIG. 4A shows 3-D eyewear 401 with curved rim 402. The side view in FIG. 4B shows the curved rim facing inward, or toward the person using the eyewear. FIG. 4C shows a person 405 wearing corrective spectacles 406 with the 3-D glasses 407 hung on the outside with the rim bent inward, shown by element 408.

With regard to FIGS. 3B and 4B, if the radius of curvature of the curved rim is sufficiently small, or the gap between elements 304 and 303 or elements 404 and 403 is sufficiently small, a clamping action firmly holds the 3-D eyewear to the user's spectacles. The glasses are designed with sufficient spring or resistance in the plastic substrate with an appropriate curvature that can be determined empirically. In such a design, the 3-D eyewear is held firmly in place by a properly designed clamp. A clamping action proves superior to hanging the 3-D eyewear onto spectacles in many instances.

Figure 5A:
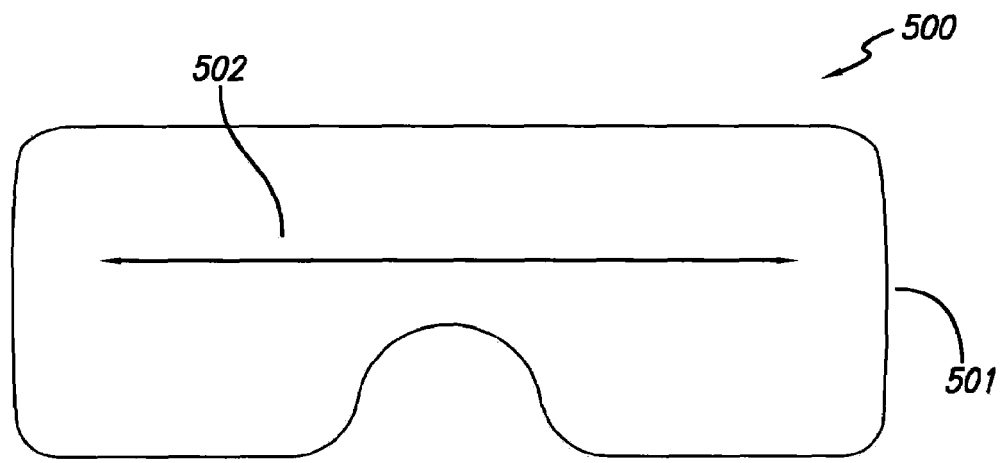
FIG. 5A illustrates construction of 3-D stereoscopic eyewear incorporating a linear polarizer substrate in accordance with the present design.
Figure 5B:
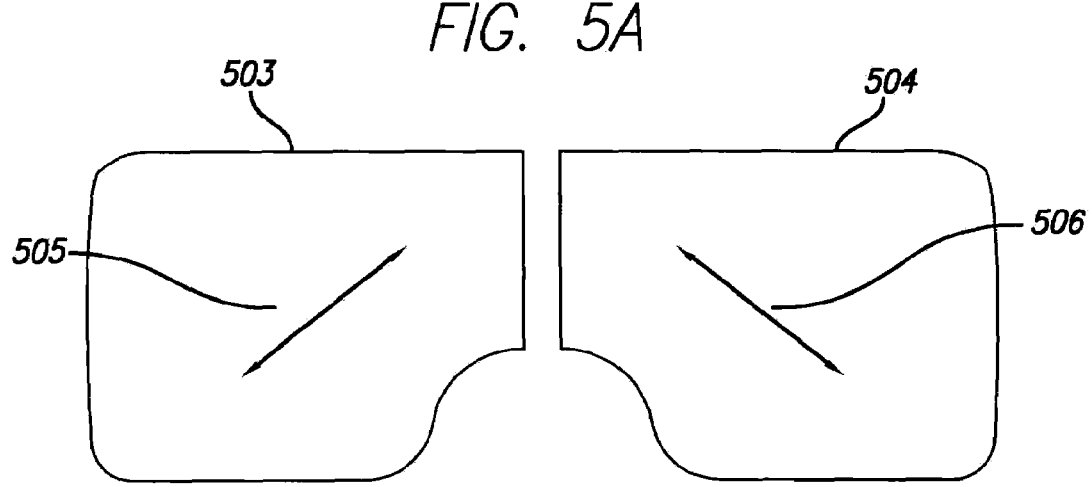
FIG. 5B shows construction of 3-D stereoscopic eyewear incorporating a quarter-wave retarder in accordance with the present design.
Figure 5C:
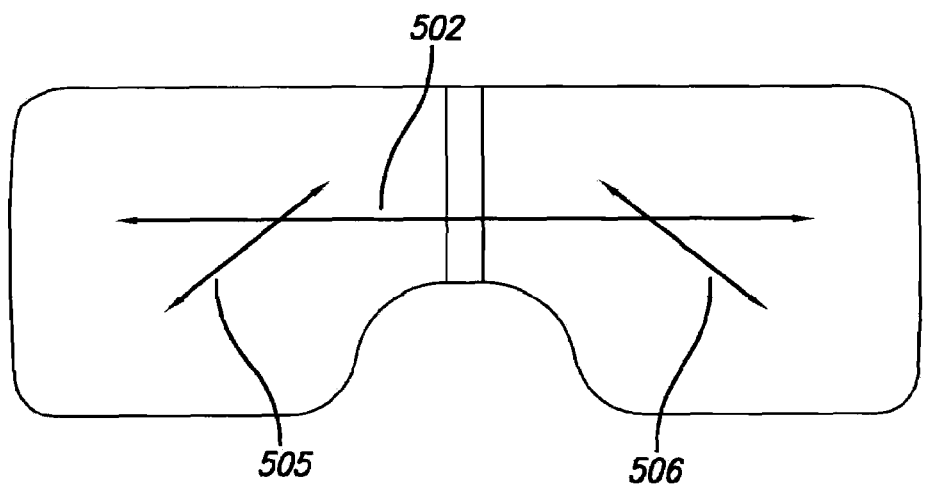
FIG. 5C illustrates construction of 3-D stereoscopic eyewear to show the completed eyewear assembly attaching a linear polarizer substrate to the quarter-wave retarder in accordance with the present design.

FIGS. 5A through 5C illustrate the construction method of the 3-D glasses. The design uses circular polarizing analyzers, but as noted earlier, other valid selection devices and techniques may be employed. The glasses 501 in FIG. 5A may be made of a linear polarizer substrate whose axis is indicated by double-headed arrow 502. Overlaid on substrate 501, in FIG. 5B, a quarter-wave retarder 503 with axis 505 is applied, as is retarder 504 with axis 506, on the left and right portions of substrate 501 respectively. The axes of 505 and 506 are orthogonal. When these materials are laminated (overlaid or attached) to the substrate of linear polarizer 501, the completed eyewear assembly will be as shown in FIG. 5C. The result is that circular polarizer analyzers of opposite handedness are produced and these will, when worn, cover the left and right eyes.

The retarder faces away from the person and toward the projection screen. The entire eyewear ensemble 507 in FIG. 5C includes elements 505 and 506 overlaid on part 501 with arrowed axes shown as previously described. This neat and cost-effective package can be configured as a 3-D eyewear product, as shown in FIGS. 2A through 2C, 3A through 3C, and 4A through 4C. The design shown in FIGS. 5A through 5C can be imagined to have a curved rim, but for didactic simplification the rim is not shown.

In addition it is possible to interchange the retarder and polarizer components of FIGS. 5A and 5B. Element 501 can be retarder rather than polarizer, and elements 505 and 506 can be linear polarizers. Many possible angular orientations of retarder/polarizer axes may be employed so long as the retarder axes are orthogonal to the polarizer axes and the resultant circular polarizers are of opposite handedness.

The parts shown in FIGS. 5A through 5C can be assembled in various ways in terms of axis orientation. For example, the linear polarizer axis 502 can be vertical rather than horizontal, in which case the retarder parts could remain in the orientation as shown. The retarder parts are preferably orthogonal to each other, but at 45 degrees to the polarizer axis to obtain a proper circular polarizer analyzer set.

One alternative design is to make 501 a clear substrate, such as a clear plastic substrate, without a polarization property, i.e. non-polarizing and non-retarding. The materials shown in FIG. 5B then become polarizers, such as linear polarizers or circular polarizers, rather than retarders. Part 503 has a polarization axis of 505, while part 504 has a polarization axis of 506. Parts 503 and 504 may be assembled onto a clear, non-polarizing non-birefringent substrate to produce linear polarizing glasses whose axes are orthogonal. The axes can be horizontal or vertical, respectively, or at any angle to the horizon, so long as their axes are mutually orthogonal. In addition, color filters as are used for the anaglyph process can be substituted for parts 503 and 504 as can a neutral density filter for either part 503 or 504 to employ the Pulfrich (with one lens clear) selection technique. Diffraction type elements for the chromostereoscopic process can also be employed.

Figure 6A:
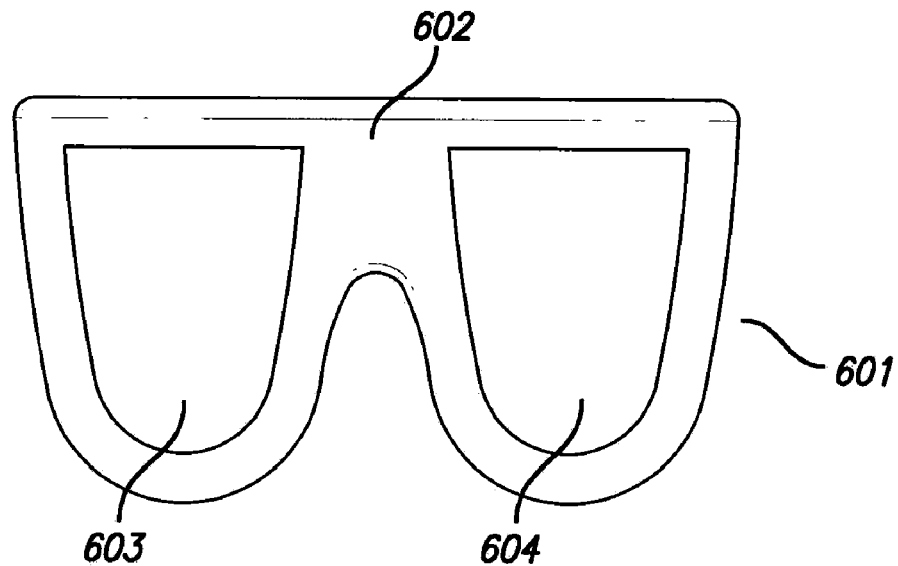
FIG. 6A is a front view of a low cost alternative embodiment of the present design.
Figure 6B:
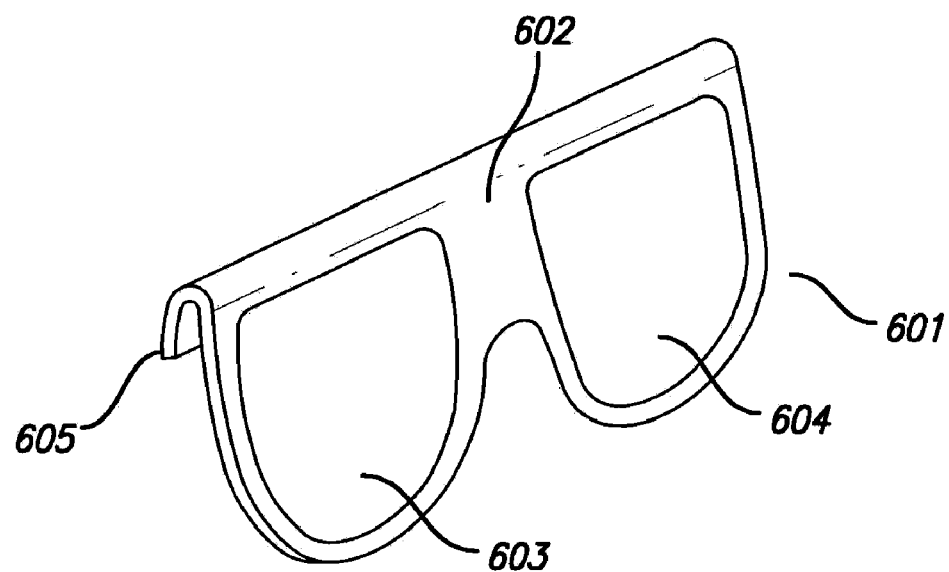
FIG. 6B is an alternate view of the low cost alternative including a curved rim or ledge for mounting the eyewear to a user's spectacles.

An alternative to the frameless eyewear embodiments present here is presented because there is a substantial manufacturing capacity for so-called cardboard or paper eyewear. In cardboard or paper eyewear, the selection lenses are mounted onto or between sheets of stiff paper or cardboard stock. FIGS. 6A and 6B present alternate designs. Cardboard-framed eyewear 601 uses cardboard frame 602 in which selection lenses 603 and 604 are mounted. The lenses may be of any kind of appropriate stereoscopic selection filter (or lens). The frames themselves are intended to be thin and to approximate the frameless style of eyewear described heretofore. This design alternative may cost less when mounting selection lenses onto or within cardboard frames rather than using the frameless approach.

FIG. 6A can be employed in a manner similar to two embodiments as described above. The drop in place embodiment, between the eyes and the spectacles, as shown in FIGS. 2A, 2B, and 2C, may be provided. These drawings serve to illustrate the functionality of such a design fabricated from a relatively light material such as cardboard. FIG. 6A includes dashed line parts 203R and 203L that secure the 3D glasses and hold them in place.

Secondly, FIG. 6A in combination with the perspective view in FIG. 6B show a variation that is functionally illustrated in FIGS. 3A through 3C and FIGS. 4A through 4C in which a curved hooked ledge 605 serves to secure the 3-D eyewear onto the spectacles. The ledge 605 may also be made of curved cardboard.

The resultant design is an elegant, simple, attractive way to use temple-piece-free 3-D eyewear and a methodology for manufacturing such 3-D eyewear using circular polarization for image selection. This type of 3-D eyewear provides comfortable viewing of stereoscopic movies because so much of the population wears corrective glasses. The new eyewear does not have temple-pieces or nosepieces. The glasses drop into place between the user's eyes and her spectacles, or they hang on to the corrective spectacles by means of curved rims on either side of the spectacle frontpiece. Moreover, one skilled in the art will appreciate that the general approach to manufacturing, as well as the form factor of the glasses, can be applied to other selection techniques such as anaglyph, Pulfrich, and chromostereopsis.

By the foregoing description, an improved 3-D stereoscopic eyewear system has been described. The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A set of eyewear for use with spectacles comprising a front piece and a plurality of temple pieces attached thereto, comprising:
   a plurality of selecting devices formed and configured to be slipped onto the front piece of the spectacles in a slip-in, self-locating detachable manner to provide stereoscopic viewing of images when worn by a user wearing the spectacles, wherein each selecting device comprises a linear polarizer substrate and a quarter wave retarder.

2. The set of eyewear of claim 1, wherein the plurality of selecting devices each comprise a substrate having the quarter-wave retarder located thereon.

3. The set of eyewear of claim 2, wherein the quarter-wave retarder for a first selecting device is oriented along a first axis and the quarter-wave retarder for a second selecting device is oriented along a second axis substantially orthogonal to the first axis.

4. The set of eyewear of claim 1, wherein said plurality of selecting devices comprise a plurality of tabs configured to enable placement of the eyewear between the spectacles and the user.

5. The set of eyewear of claim 1, wherein said plurality of selecting devices comprise means for affixing the set of eyewear to the prescription spectacles.

6. The set of eyewear of claim 1, wherein said plurality of selecting devices comprises a curved ridge configured to affix the plurality of selecting devices to the prescription spectacles.

7. The set of eyewear of claim 1, wherein the plurality of selecting devices comprise a relatively clear plastic substrate without a polarization property having at least one polarizer provided thereon.

8. The set of eyewear of claim 7, wherein one linear polarizer associated with one selecting device has a first orientation along a first axis and another linear polarizer associated with another selecting device has a second orientation along a second axis orthogonal to the first axis.

9. A set of eyewear for use with spectacles worn by a user when viewing stereoscopic images, the spectacles comprising a front piece and a plurality of temple pieces, the set of eyewear comprising:
   a substrate forming a first selection device and a second selection device; and
   optical materials provided on the substrate, the optical materials comprising:
      first optical material associated with the first selection device and providing a first orientation along a first axis; and
      second optical material associated with the second selection device and providing a second orientation along a second axis substantially orthogonal to the first axis;

wherein the set of eyewear is configured to be slipped onto the front piece of the spectacles in a slip-in, self-locating detachable manner and the substrate and optical materials facilitate viewing of stereoscopic images, and wherein the substrate comprises a linear polarizer substrate and the optical materials comprise a quarter wave retarder.

10. The set of eyewear of claim 9, wherein the set of eyewear is configured to be positioned between the spectacles and eyes of the user.

11. The set of eyewear of claim 9, wherein the substrate is a substantially clear plastic and the optical retarder materials comprise a polarizer.

12. The set of eyewear of claim 9, wherein said plurality of selecting devices comprise a plurality of tabs configured to enable placement of the eyewear between the spectacles and the user.

13. The set of eyewear of claim 9, wherein the substrate and the optical materials are fixedly mountable to the spectacles using a curved ridge attached to the substrate and optical materials.

14. The set of eyewear of claim 9, wherein the substrate and the optical materials are fixedly mountable to the spectacles using a plurality of tabs configured to enable placement of the eyewear between the spectacles and the user.

15. The set of eyewear of claim 9, further comprising a frame fabricated from one from a group comprising pressed paper and cardboard.

16. A set of eyewear for use with a set of spectacles worn by a user enabling relatively clear user viewing of stereoscopic images, the set of spectacles comprising a front piece and a plurality of temple pieces, the set of eyewear comprising:
    a first selection device and a second selection device formed of a substrate; and
    optical materials provided on the substrate, the optical materials comprising:
        first optical material associated with the first selection device; and
        second optical material associated with the second selection device;
    wherein the set of eyewear is configured to slip onto the front piece of the spectacles in a slip-in, self-locating detachable manner and the first selection device, second selection device, and optical materials facilitate viewing of stereoscopic images, and wherein the substrate comprises a linear polarizer substrate and the optical materials comprise a plurality of quarter wave retarders.

17. The set of eyewear of claim 16, wherein the set of eyewear is configured to detachably slip onto the front piece of the spectacles using fixedly mounting means comprising a curved ridge attached to the first selection device and the second selection device.

18. The set of eyewear of claim 16, wherein the set of eyewear is configured to detachably slip onto the front piece of the spectacles using fixedly mounting means comprising a plurality of tabs configured to enable placement of the eyewear between the spectacles and the user.

* * * * *